Patented July 12, 1949

2,475,966

UNITED STATES PATENT OFFICE 2,475,966

PREPARATION OF ACYL HALIDES

David C. Hull, Oak Ridge, Tenn., assignor to Eastman Kodak Company, Rochester, N. Y., a corporation of New Jersey No Drawing. Application December 4, 1945, Serial No. 632,813

4 Claims. (Cl. 260—544)

This invention relates to the preparation of acyl halides and more specifically to a process for the preparation of acetyl halides, such as acetyl chloride.

Acyl halides typified by acetyl chloride, have heretofore been prepared, for example, by the interaction of a salt of an organic acid with phosphorous trichloride or phosphorous oxychloride, in accordance with the following equations:

3 RCOONa+PCl$_3$→3 RCOCl+Na$_3$PO$_3$
2 RCOONa+POCl$_3$→2 RCOCl+NaPO$_3$+NaCl

Acid chlorides may also be prepared by the action of phosphorus or sulfur halides on organic acids, as, for example, by the reaction between phosphorus pentachloride, sulfuryl chloride, or phosphorus trichloride and the acid in accordance with one of the following equations:

PCl$_5$+RCOOH→POCl$_3$+RCOCl+HCl
SOCl$_2$+RCOOH→SO$_2$+RCOCl+HCl
PCl$_3$+3 RCOOH→P(OH)$_3$+3 RCOCl

The acid chlorides may also be prepared by the interaction of an alcohol and a hydrogen halide, by the action of phosphorus halides on alcohols, and many other methods.

I have now found that acyl halides may be prepared by reactions between certain unsaturated esters and dry hydrogen halides as for example, by the reaction between isopropenyl acetate and hydrogen chloride.

It is, accordingly, an object of my invention to provide an improved process for the production of acyl halides. A further object is to provide a process whereby certain unsaturated esters may be converted into the desired acyl halides. A still further object is to provide a process for the preparation of acyl halides such as acetyl chloride, acetyl bromide, acetyl iodide, acetyl fluoride and various other acyl halides. Other objects will appear hereinafter.

These objects are accomplished by the following invention which, in its broader aspects, involves reacting an unsaturated monocarboxylic ester of the following formula:

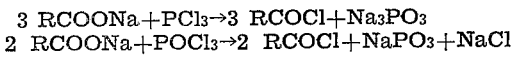

wherein R and R$_1$ each represents an alkyl group, an arylalkyl group or an aryl group, with a hydrogen halide. I have found that when the hydrogen halide in gaseous form is brought into intimate contact with an unsaturated ester, such as isopropenyl acetate, preferably diluted with an appropriate diluent such as diethyl ether, a reaction takes place wherein the acetyl or other acyl chloride is produced. My process proceeds according to the following equation:

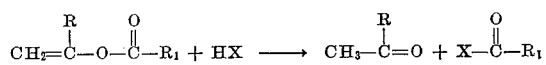

wherein R and R$_1$ each have the significance indicated above and X is a halogen.

Typical of the unsaturated esters which I may employ in accordance with my invention are: isopropenyl acetate (2-acetoxypropene-1), 2-acetoxyhexene-1, 2-acetoxyheptene-1, 2-(chloroacetoxy)-hexene-1, 2-benzoyloxyhexene-1, alpha - acetoxy - styrene, 2-(phenylacetoxy)-propene-1, 2-acetoxy-3-phenylpropene, etc. Such unsaturated esters in which the acid radical is an acetate radical (i. e. acetoxy derivatives) can be prepared by condensing the appropriate ketone with ketene, in the presence of sulfuric acid. See Gwynn and Degering, Journal of the American Chemical Society, 64 (1942) 2216, and Gwynn and Degering United States Patent No. 2,383,965. All the unsaturated esters can be prepared by adding a monocarboxylic acid (e. g. acetic acid, propionic acid, butyric acid, benzoic acid, etc.) to the appropriate monosubstituted acetylene, in the presence of boron trifluoride. See Hennion and Nieuwland, Journal of the American Chemical Society, 56, (1934) 1802.

In the following examples and description I have set forth several of the preferred embodiments of my invention, but they are included merely for purposes of illustration and not as a limitation thereof.

*Example 1.—Preparation of acetyl chloride*

Dry hydrogen chloride gas at 0° C. was bubbled into a mixture of 108.3 grams of isopropenyl acetate and 88.8 grams of diethyl ether (diluent) giving 242.4 grams of product. Distillation of the product at atmospheric pressure (740 mm.) in a fractionating column gave 48.9 grams of distillate between 36–56° C. To a portion of the distillate aniline was added and extracted once with ether and the product recrystallized from water. The resulting derivative of acetyl chloride (acetanilide) had a melting point of 113–115° C. An 18% yield of acetyl chloride was obtained.

*Example 2.—Preparation of acetyl bromide*

Dry hydrogen bromide gas was bubbled into a mixture of 100 grams of isopropenyl acetate and 80 grams of ether (diluent) at 10° C. giving 250 grams of product. The material was distilled in a fractionating column at atmospheric pressure. The ether distilled off at 30–45° C. 14 grams of acetone were recovered at 45–60° C. From 60–80° C. 30 grams of acetyl bromide, most of which boiled at 75° C., were collected. Aniline was added to this cut and the resulting mixture extracted with ether and the product recrystallized from water. The derivative thus obtained (acetanilide) had a melting point of 113–115° C. A 20% conversion to acetyl bromide was obtained.

*Example 3.—Preparation of acetyl iodide*

Dry hydrogen iodide gas was bubbled into a mixture of 110 grams of isopropenyl acetate and 80 grams of ether (diluent) at 10° C. giving 260 grams of reaction mixture. This was distilled in a fractionating column at atmospheric pressure. The ether distilled off at 30–45° C. and 15 grams of acetone were recovered at 45–60° C. After removing the unreacted isopropenyl acetate at temperatures up to 100° C. a fraction was taken from the mixture at 100–110° C. which was determined to be acetyl iodide, most of which distilled over at 107° C. at 740 mm. pressure. A 25% conversion to acetyl iodide was obtained.

It will thus be seen that I have provided a valuable and wholly novel and unusual method of preparing acetyl halides and various other acyl halides.

What I claim is:

1. The process of producing an acyl halide which comprises reacting an unsaturated monocarboxylic ester of the following formula:

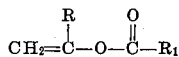

wherein R and R₁ each represents a member selected from the group consisting of alkyl, arylalkyl and aryl groups with a hydrogen halide.

2. The process of producing acetyl chloride which comprises reacting isopropenyl acetate with dry hydrogen chloride.

3. The process of producing acetyl bromide which comprises reacting isopropenyl acetate with hydrogen bromide.

4. The process of producing acetyl iodide which comprises reacting isopropenyl acetate with hydrogen iodide.

DAVID C. HULL.

REFERENCES CITED

The following references are of record in the file of this patent:

UNITED STATES PATENTS

| Number | Name | Date |
| --- | --- | --- |
| 1,326,040 | Durrans | Dec. 23, 1919 |
| 1,936,739 | Townend | Nov. 28, 1933 |

FOREIGN PATENTS

| Number | Country | Date |
| --- | --- | --- |
| 464,797 | Great Britain | 1935 |

OTHER REFERENCES

Chamberlain, Organic Chemistry, p. 124 (3 ed. 1934).